H. W. Knowlton,
Halter,

N° 48,957. Patented July 25, 1865.

Witnesses
Wm Trewin
Thos Tusch

Inventor
H. W. Knowlton
per Munn & Co
Attorneys

UNITED STATES PATENT OFFICE.

HOMER W. KNOWLTON, OF SARATOGA SPRINGS, NEW YORK.

IMPROVEMENT IN HORSE-CHAINS.

Specification forming part of Letters Patent No. 48,957, dated July 25, 1865.

*To all whom it may concern:*

Be it known that I, HOMER W. KNOWLTON, of Saratoga Springs, in the county of Saratoga and State of New York, have invented a new and useful Improvement in Horse and other Chains; and I do hereby declare that the following is a full, clear, and exact description thereof, which will enable those skilled in the art to make and use the same, reference being had to the accompanying drawings, forming part of this specification.

This invention relates to a new and useful improvement in the T end of a horse or other chain, which is fitted in a ring of the latter in order to attach the chain of a halter to a post or other fixture, or which is fitted in the ring of a bit in order to attach the horse to the post.

The ordinary T ends are rigid and simply inserted in or through the ring, and they frequently become detached by the horse in shaking the chain.

My invention is designed to obviate this difficulty; and it consists in forming the T end with a joint, and constructing the whole in such a manner that the T cannot be inserted through the ring or withdrawn therefrom without doubling it, thereby rendering it impossible for the T end to casually slip out from the ring.

Figure 1:
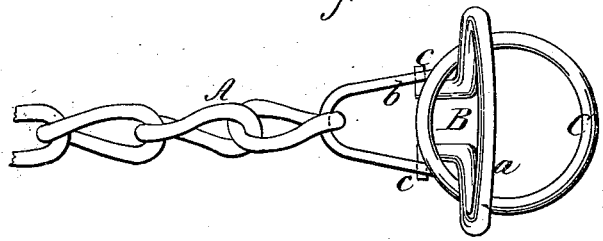
Figure 2:
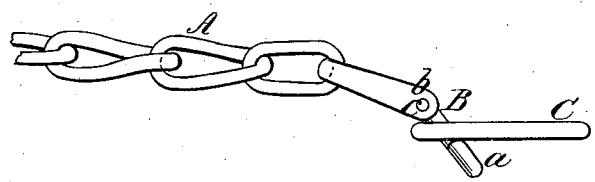
Figure 3:
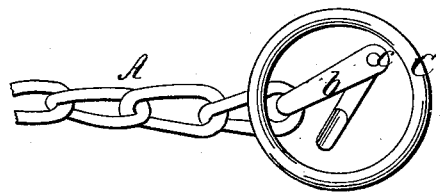

In the accompanying drawings, Figures 1 and 2 represent a horse-chain with the T end inserted in the ring; Fig. 3, a view of the same with the T end doubled and in the act of being passed through the ring.

Similar letters of reference indicate corresponding parts.

A represents a horse-chain, and B the T end thereof.

C is a ring, which may be considered as being attached to the chain, or as the ring of a bridle-bit.

The T end B has its cross-head $a$ of such a length in proportion to its shank $b$ that it cannot, when said shank is straight or at right angles with the cross-head, be passed through the ring, and the shank is constructed with a joint, $c$, (shown in all of the figures,) to admit of it being doubled, when required, so that both the shank and the cross-head may be passed through the ring, as will be fully understood by referring to Fig. 3.

It will be seen from the above description that as the cross-head $a$ cannot be passed through the ring without doubling the shank $b$ it cannot, of course, be drawn out therefrom without doubling the shank, and hence the casual withdrawal of the cross-head is rendered impossible. Thus by this simple means the T end is rendered a very efficient chain-fastening, and horses may be secured by it to a post or other fixture without any chance whatever of freeing themselves or of the T end becoming accidentally detached.

I claim as new and desire to secure by Letters Patent—

Constructing the T ends of horse and other chains with a joint in their shanks, to operate substantially as and for the purpose herein set forth.

HOMER W. KNOWLTON.

Witnesses:
 D. A. KNOWLTON,
 C. D. KNOWLTON.